United States Patent [19]
Isono

[11] 3,851,278
[45] Nov. 26, 1974

[54] INVERTER CIRCUIT

[75] Inventor: Tadao Isono, Tokyo, Japan

[73] Assignee: Nikon Beru-Haueru Kabushiki Kaisha (Bell & Howell Japan, Ltd.), Tokyo-to, Japan

[22] Filed: June 12, 1973

[21] Appl. No.: 369,344

[30] Foreign Application Priority Data
June 12, 1972 Japan.............................. 47-69179

[52] U.S. Cl. .............................. 331/113 A, 321/2
[51] Int. Cl. ............................................ H02m 7/52
[58] Field of Search...................... 331/113 A; 321/2

[56] References Cited
UNITED STATES PATENTS

| | | |
|---|---|---|
| 2,997,664 | 8/1961 | Jensen .......................... 331/113 A |
| 3,002,142 | 9/1961 | Jensen .......................... 331/113 A |

*Primary Examiner*—John Kominski
*Attorney, Agent, or Firm*—John E. Peele

[57] ABSTRACT

An improvement is disclosed for converting variable input voltages to alternating current outputs of constant voltage. The circuit provides a lighter, more simple and more economical converter by providing a second output transformer with a feedback circuit connected to actuate switching transistors and a saturable input transformer. The power, which may have been of either alternating or direct current origin, is converted to alternating current and fed to a first output transformer for gross conversion and to a second output transformer for finer adjustments to the desired constant output voltage.

2 Claims, 1 Drawing Figure

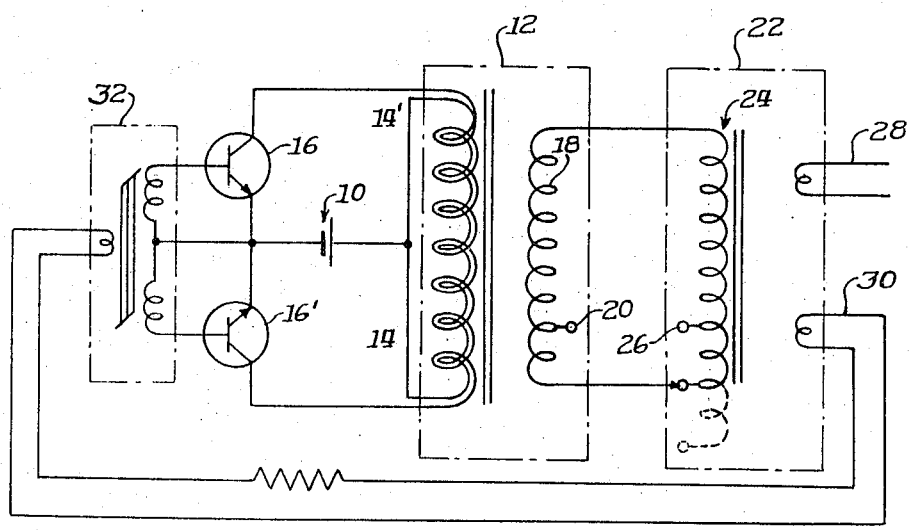

INVERTER CIRCUIT

This invention relates to an improved inverter circuit for changing several input voltages to a preferred alternating current output voltage.

Known inverter circuits to be substituted for transformers to step-up and step-down voltages have included transistors and a saturating transformer. However, a detrimental characteristic of these circuits is that the output voltage varies substantially proportionally to the input voltage. Hence, as the input voltage changes, as might occur when a user of the instrument must use different power supplied during travels from one country to another, the output voltage of the inverter is similarly varied. Therefore, the more simple and economical of the existing inverter circuits can not be used in instruments requiring relatively constant voltage alternating current.

To overcome the deficiencies of existing inverter circuits, other components are added to the instrument and circuitry thereby increasing cost, weight, and bulkiness of the instrument. An example of the added components is the necessity of providing additional taps and windings on the output coil of the inverter transformer whereby output voltage variations may be compensated. Further, the coils of the transformer often must be trifilar windings in order to obtain a good electrical coupling. These special windings require a more difficult coil making operation making the resulting systems more expensive. A further disadvantage is in the requirement for additional insulation of the coil which must be heavier to maintain protection. Hence, efficient inverter systems may approach the weight and size of transformer circuits, and often exceed their cost.

In the existing methods of converting alternating current of a first voltage to alternating current of another voltage, there is uniformity in the saturating voltage applied to the transistor switches. Hence, changes in the input voltage cause a proportional difference of the output voltage. To equalize the voltages at the output, a different number of windings must be provided on the transformer for compensating for the variations of the input voltage. Hence, the winding operations for such specialized transformers with different numbers of windings makes the unit more complex and more expensive.

The present invention provides three definitive advantages over comparable known inverter systems by providing a highly efficient system of reduced size and light weight. Portable multi-voltage equipment such as motion picture projectors can best take advantage of these desirable features. Particularly, the inverter system accepts input power from either an alternating current or direct current source having a range of voltages, and converts these voltages to a constant output voltage. Internally, alternating current input voltage is rectified to a direct current voltage. A pair of transistors and a saturable transformer change the direct current voltage to high frequency alternating current voltage. This high frequency voltage is transformed by a first transformer to an intermediate level in the preferred range of a second transformer. By selectively tapping the secondary of the second transformer, the varying input voltages are converted to a substantially constant output voltage.

An object of this invention is to provide a simplified inverter having at least two output transformers of conventional core winding construction to compensate for the output voltage differences due to uniformity of saturating current applied to a saturable transformer and to a transistorized switching circuit.

Further objects and advantages of the invention will be apparent from a detailed description of the mechanism shown in the accompanying drawings, in which:

The sole FIGURE is a schematic of a preferred form of the inverter circuit according to this invention.

Referring to the drawings, the inverter circuit of the invention is connected to a line source 10 which supplies a range of voltages, not shown, which voltage and the frequency thereof is known. By known rectifier circuitry, the power if alternating current is converted to direct current and applied to a first transformer 12 having bifilar input coils 14 and 14$^1$ in the primary thereof. These coils are connected in circuit with transistors 16 and 16$^1$ which when selectively energized serve as switching transistors. An output coil 18 on which a tap 20 is provided is the secondary of transformer 12. A second transformer 22 has an input coil 24 which includes an input voltage changing tap 26. In the secondary of the second transformer 22 are an output coil 28 and a feedback coil 30. These first and second transformers 12 and 22 are selected with a combination of a selected number of windings and a selected core cross sectional area so that the transformers are not saturated at the frequency and voltage at which they are to be operative.

The input power may be provided from a source of any of several known frequency and voltage combinations. This power if alternating current is rectified by known circuits and applied to the source 10 as a voltage E. From this source, the direct current voltage is fed to a saturating transformer 32 of known construction. Such a transformer in combination with the transistors controls the frequency of the power is applied to the primary input coils of the transformer 12. Upon reaching saturation, the transformer 32 switches one transistor on and switches the other transistor "off" thereby causing a reversal of current flow in the bifilar input windings 14, 14$^1$ of the transformer 12. Oscillation of current flow through the saturating transformer 32 is initiated when the first pulse triggers the circuit. Thereafter, the switching frequency of the transistors is controlled by the feedback circuit when the feedback coil 30 is energized intermittently from the output of the second transformer 22. Because the output controls the input in this feedback circuit, a relatively high controlled frequency is maintained through the inverter.

The high frequency alternating current supplied to the primary of transformer 12 is selected to provide an efficient power transfer to the secondary coils 18 of that transformer. The tap 20 is selectable or positionable to enable gross adjustment of the output of the secondary of the first transformer to be most efficient for the input of the second transformer. The tap 26 of the latter transformer permits finer adjustment according to the several input frequencies and voltages to enable the mechanism powered thereby to be efficiently operated by a constant voltage output power received through a winding 28 in the secondary of the second output transformer 22.

When the input voltage applied to the source 10 is changed from a first value E to a different value E$^1$, the output voltage from the first transformer is proportionally varied, if the voltage drop of transistors 16, 16¹ is ignored. However, if the tap 26 of primary coil 24 of the second transformer 22 is modified in proportion to $E/E^1$, and the tap 20 is connected to the secondary coil 18 of the first transformer 12 at a like ratio, the voltage of the secondary coil 18 and the feedback coil 30 of the second transformer 22 becomes constant. Therefore, the output frequency and voltage applied to the load become constant.

The position of the tap on the input coil of the transformer can be altered according to the input voltages with which the inverter circuit is to be used. The positioning may be either by switching or changing the connection of a terminal to correspond to the voltage indicated at that time. Since the frequency of the alternating current applied to both output transformers 12 and 22 is relatively high, the cores of these transformers are relatively small in comparison with those of transformers handling low frequency current. Hence, the space required for the coils is substantially less than might be expected for the power handled. Further, the inverter circuit can be manufactured for a lower cost than the more complex conventional inverter circuits in that simpler coil winding arrangements and interconnecting circuits are used. Also, the use of two relatively small output transformers enables an overall reduction in size and weight over the known inverter systems while maintaining an efficient conversion of variable input power to the desired frequency and voltage output level.

It will be understood that modifications and variations may be effected without departing from the scope of the novel concept of the present invention.

What is claimed is:

1. An inverter circiut for converting variable voltage inputs of direct current to alternating current at a constant output voltage comprising:
   a saturable transformer;
   a pair of switching transistors in operative connection with said saturable transformer;
   an output transformer having a bifilar coiled primary consisting of two coils with one of said coils connected to one of said transistors and the other of said coils connected to the other of said transistors for converting said direct current to alternating current for application to the secondary of said output transformer; and
   a second output transformer having the primary thereof connected to the secondary of said first output transformer and having the secondary thereof include a load output coil and a feedback output coil for regulating the saturating frequency applied to said saturable transformer.

2. An inverter circuit as in claim 1 including taps adjusting the output of said output transformers for modifying said output voltage in accord with the input voltage.

* * * * *